J. E. ROBISON.
WATER OR OTHER LIQUID HOLDING TANK FOR AUTOMOBILES.
APPLICATION FILED NOV. 7, 1921.
1,411,378.
Patented Apr. 4, 1922.
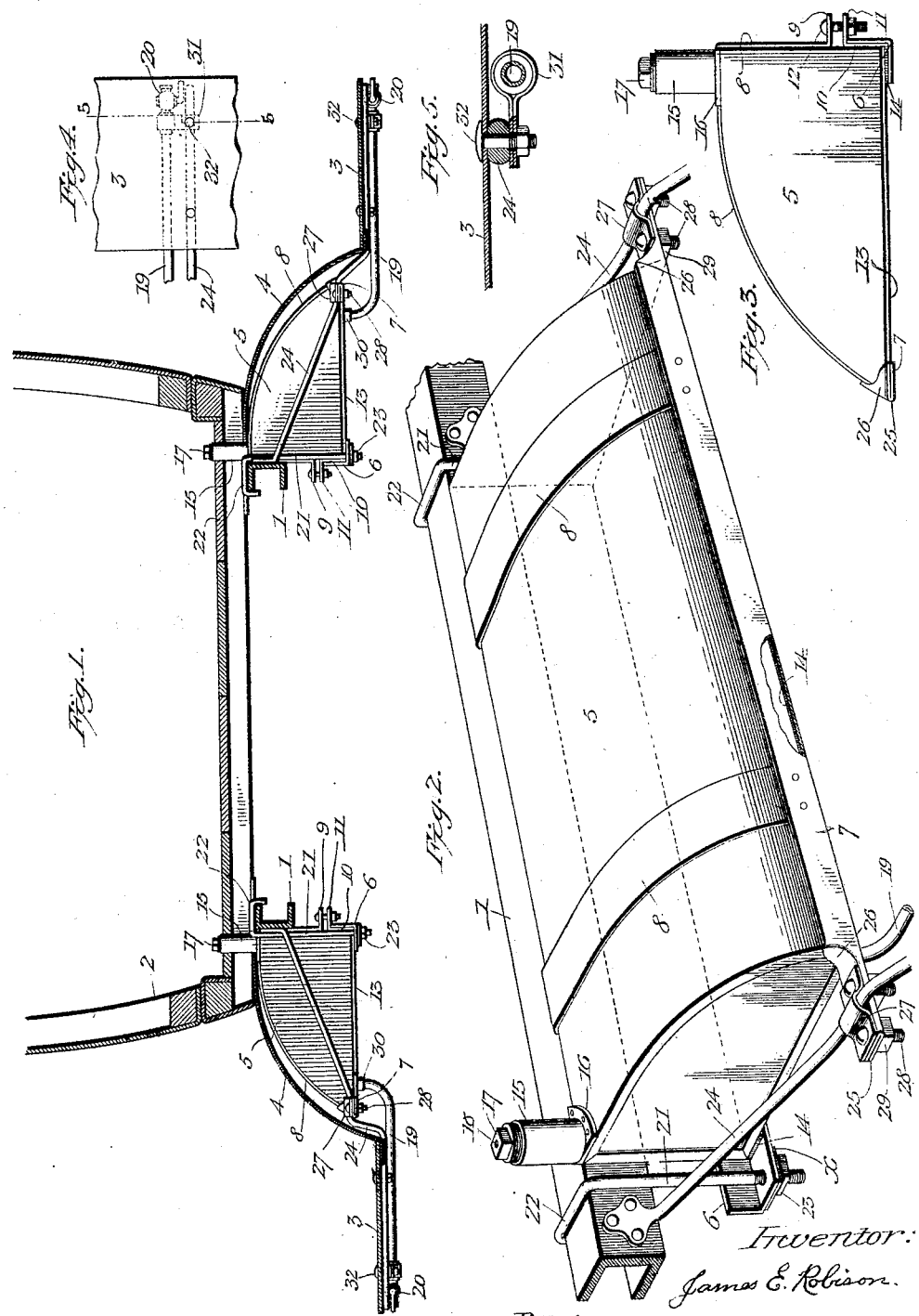

UNITED STATES PATENT OFFICE.

JAMES E. ROBISON, OF DENVER, COLORADO.

WATER OR OTHER LIQUID HOLDING TANK FOR AUTOMOBILES.

1,411,378.   Specification of Letters Patent.   Patented Apr. 4, 1922.

Application filed November 7, 1921. Serial No. 513,429.

*To all whom it may concern:*

Be it known that I, JAMES E. ROBISON, a citizen of the United States of America, residing at the city and county of Denver and State of Colorado, have invented new and useful Water or other Liquid Holding Tanks for Automobiles, of which the following is a specification.

This invention relates to water or other liquid-holding tanks for automobiles.

The object of the invention is to provide a tank which is adapted to be secured to the frame of a car beneath the body thereof, having a valved outlet pipe leading therefrom to a point convenient of access to an attendant.

Further, to provide a tank or a pair of tanks for an automobile, each of which is secured to one of the side bars of the frame of the automobile and to the running board brackets, preferably between the said side bar and the running board shield, said tank having a filling neck which projects up through an opening in the floor of the car, and is provided with a screw cap, the tank being also provided with an outlet pipe which extends out beneath the running board as far as the front edge thereof, and is provided with a cut-off valve or cock, the said tank or tanks being both out of view and out of the way.

These objects are accomplished in the manner illustrated in the accompanying drawings, in which:

Figure 1, is a transverse sectional view through a portion of an automobile, showing the manner of securing the tank to one of the side bars of the frame, and to the running board brackets.

Fig. 2, is a perspective view of a tank secured as shown in Figure 1, a portion only of one of the side bars being shown.

Fig. 3, is an end view of the tank detached.

Fig. 4, is a plan view of a fragment of one of the running boards, showing a portion of one of its supporting brackets and the manner of securing the tank outlet pipe thereto; and Fig. 5, is an enlarged sectional view on the line 5—5 of Figure 4.

Referring to the accompanying drawings: The numeral 1, indicates the usual channel form of side bars of the frame or chassis of an automobile, and 2, the automobile body which is supported on the said frame in the usual manner; 3, indicates the running boards, and 4, the curved shields, the outer edges of which are secured to the running boards and extend thence up and under the car body, to which they are secured in the usual manner. The tanks 5, are preferably positioned between the side bars 1, and the shields 4, and for this reason, their upper sides are curved to conform to the curvature of the shields 4, beneath which the greater portions of the tanks lie, while the bottom and the remaining side of each tank are at right angles.

Each tank is supported in a skeleton frame comprising angle bars 6 and 7, which extend along the lower corners of the tank and a short distance beyond each end of the same; metal straps 8, which are riveted at one end to the angle bars 7, and extend over the curved side of the tank and down the vertical side of the same, to within a short distance of the angle bar 6, where they terminate in horizontal apertured ears 9, angle plates 10, the vertical members of which are riveted to the angle bars 6, their horizontal members 11, being apertured and in alignment with the ears 9, bolts 12, being passed through the ears 9 and 11, and receive nuts which are screwed against one or the other of the ears; and horizontal metal straps 13, which connect the angle bars 6 and 7, and extend beneath the bottom of the tank. Strips of felt or suitable fabric 14, are interposed between the angle bars and the tank, to make a tight connection between these parts, thus also preventing rattling, and when the nut on the bolt 12, is tightly clamped against the ear 9, or 11, as the case may be, the tank is securely held in the supporting skeleton frame.

Upon the forward upper corner of each tank is a short vertical tube 15, having a flange 16 on its lower end, which is riveted or otherwise secured to the tank. The tube 15, constitutes the filling tube for the tank, and its upper end is normally closed by a cap or nut 17, which is unscrewed from the tube to permit of the filling of the tank. The cap 17, is provided with a vent or small aperture 18, through which air enters the tank when the contents of the same is being drawn off, thus preventing the forming of a vacuum in the tank. An outlet pipe 19, extends from the bottom of the tank and is provided at its outer end with a cock or cut-off 20.

The tank is placed under the body of the car between one of the side bars 1 and the adjacent running board shield 4, its top portion bearing against the under side of the car body, and the filling neck or tube 15, extending through an aperture in the floor of the car, so as to be accessible from the interior of the car. The horizontal members of the projecting ends of the angle bars 6, are apertured, and the threaded end portions of hooked hanger rods 21, are passed through the said apertures, the upper hooked ends 22, of these rods engaging the adjacent side bar 1. A nut 23, is screwed upon the threaded portion of each hanger rod 21, and against the under side of the angle bar 6, or against a plate or washer X, which is interposed between the nut and the under side of the angle bar, and when the nuts 23, are forcibly turned against the angle bar, the upper portion of the tank is thereby pressed against the under side of the car body and the hooks 22, are at the same time forcibly clamped upon the side bar, thus firmly holding the inner side of the tank against the under side of the car body and to the adjacent side bar 1.

The outer edge of the tank is supported in the following manner:

Each tank is positioned between two brackets 24, which are rigidly secured at their rear ends to one of the side bars 1, their front ends extending beneath and being bolted to the adjacent running board. The extended ends of the angle bars 7, which are secured along the outer edge of the tanks, are arranged as shown clearly in Figure 2; that is, the vertical wings of these extended ends are bent over to lie upon the horizontal wings, as shown at 25, and at the point where the bent-over portion joins the vertical portion, a shoulder 26, is formed, which bears against the adjacent end of the tank, and these two shoulders 26, prevent the tank from moving endwise in the skeleton frame. The extended ends of the angle bar 7, lie beneath and against the running board brackets 24, and they are secured to these brackets by clips 27, which are curved to lie over the brackets, the end of said clips being bolted to the extended end portions of the said bar 7, by bolts 28, which pass through apertures in the said end portions and receive clamping nuts 29. Thus the inner sides of the tank are supported by the hook rods 21, and the opposite side of the tank is supported by the running board brackets. The outlet pipes 19, leading from the tanks, are screwed into flanged nipples 30, which are secured to the bottom of the tank, and are then bent outward to lie beneath and close to the running boards 3, and their outer ends, having the cut-off valves 20, are secured to the brackets 24, by clips 31, in the form of metal strips, which are bent to surround the pipes, the free end portions of these strips being bolted to the adjacent brackets 24, by the same bolts 32, which secure the running boards 3, to the said brackets 24.

The tanks may carry a supply of water, or one of them may carry water and the other may carry an extra supply of gasoline. The water may be used both for washing purposes and for replenishing the water supply in the radiator, thus contributing added comfort and convenience to the occupants of the car.

Having described my invention, what I claim as new and desire to secure by Letters Patent, is:

1. The combination with an automobile body, its supporting frame, the running boards and pairs of brackets connecting each running board with said supporting frame, of a horizontal tank located beneath the body and between each pair of brackets, and secured to said brackets and the adjacent bar of the supporting frame; outlet pipes connected to said tanks and extending out beneath said running boards, said pipes having cut off valves on their ends, and capped filling necks on said tanks which extend up through the floor of said body.

2. The combination with an automobile body, its supporting frame, the running boards and pairs of brackets connecting each running board with the adjacent bar of the supporting frame; of a horizontal tank located beneath the body and between each pair of brackets, and abutting against the adjacent side bar of the frame, means whereby said tanks are supported from said side bars and clamped against the under side of said body, means for further securing the tanks to said brackets; outlet pipes connected to said tanks and extending out beneath said running boards, their outer ends having cut-off valves and capped filling necks on said tanks which extend up through the floor of said body.

3. The combination with an automobile body, its supporting frame, the running boards, and pairs of brackets connecting each running board with the adjacent bar of the supporting frame, of a horizontal tank located beneath the body and between each pair of brackets, and abutting against the adjacent side bar of the frame; depending rods in hooked engagement with said side bars and extending through projections on said tanks, and nuts on the end of said rods by which said tanks are clamped against the under side of said body; capped filling necks on said tanks which extend up through the floor of said body, projections on the outer lower corners of said tanks, clips connecting said projections with said brackets, and outlet pipes connected to said tanks and extending out beneath said running boards, and having cut-off valves on their outer ends.

4. The combination with an automobile body, its supporting frame, the running boards and pairs of brackets connecting each running board with the adjacent bar of the supporting frame, of a horizontal tank located beneath the body and between each pair of brackets, and abutting against the adjacent side bars of the supporting frame; angle bars secured along the opposite lower side edges of said tanks, and beyond their ends, depending rods in hooked engagement with the side bars of the supporting frame, and passing through apertures in the end portions of the adjacent angle bars; clamp nuts on the ends of said rods; clips which connect the ends of the outer angle bars with the adjacent brackets; capped filling necks on said tanks which extend up through the floor of said body, and outlet pipes connected to said tanks and extending out beneath said running boards, and having cut-off valves on their outer ends.

5. The combination with an automobile body, its supporting frame, the running boards and their supporting brackets, which are secured to said frame, and curved plates connecting the running boards with the body of horizontal tanks, each comprising one vertical side which rests against the outer face of one of the side bars of the frame, a flat bottom, and a curved top which extends from the outer edge of the bottom to the upper edge of the vertical side, each tank being located between a pair of said brackets and in engagement with the under side of the car, their curved tops conforming with the said curved plates; angle bars secured along the opposite lower side edges of said tanks and beyond their ends; depending rods in hooked engagement with the side bars of the supporting frame, and which pass through the end portions of the inner angle bars and clamped nuts on the portions of said rods, whereby said tanks are clamped against the under side of said body; clips which secure the end portions of the outer angle bars to the adjacent running board brackets; filling necks on said tanks which extend up through the floor of the body, and outlet pipes connected to said tanks and extending out beneath the running boards, said pipes having cut-off valves on their outer ends.

6. In a device of the character described, the combination with an automobile body and its supporting frame, the running boards and brackets connecting them with the side bars of said supporting frame, of liquid-holding tanks beneath said body, skeleton frames for said tanks comprising angle bars extending along the lower longitudinal edges of said tanks and metal straps for securing said bars to said tanks, hooked rods for connecting the inner angle bars of said skeleton frames to the side bars of said supporting frame, said rods having threaded lower end portions which extend through the end of said angle bars, and clamping nuts on said threaded end portions, clips and bolts for securing the ends of the outer angle bars of said skeleton frames to said running board brackets, valved outlet pipes extending from said tanks and beneath the said running boards, to the outer edges of the same, clips and bolts for securing the outer portions of said pipes to said brackets, and capped filling necks on said tanks which extend up through the floor of said body.

7. In a device of the character described, the combination with an automobile body and its supporting frame, the running boards, the brackets connecting the same with the side bars of the supporting frame and the curved shields connecting the said running boards and body, of liquid-holding tanks beneath said body and located between said side bars and said shields, the upper sides of said tanks being curved to conform to the curvature of said shields, bars extending along the lower side edges of said tanks, metal straps connecting said bars to said tanks, clips connecting the ends of the outer bars to the running board brackets, rods having hooked upper ends which engage the side bars of the frame, and threaded end portions which extend through the ends of the inner bars, jam nuts on said threaded ends which force the tanks into engagement with the under side of the car body, filling necks on said tanks which extend up through the floor of the body and are provided with screw caps having vents, outlet pipes connected to the tanks and extending beneath the said running boards, and cut-off valves on the outer ends of said pipes.

8. The combination with an automobile body and its supporting frame, the running boards and their curved shields, of horizontal tanks beneath and in engagement with said body and arranged to lie between said shields and the side bars of said frame and parallel with said bars, means for securing said tanks in such positions to said frame, capped filling tubes for said tanks which extend up through the floor of the body, and valved outlets for said tanks.

In testimony whereof I affix my signature in presence of two witnesses.

JAMES E. ROBISON.

Witnesses:
G. SARGENT ELLIOTT,
ELIZABETH SMITH.